3,117,149
UNSYMMETRICAL POLY(ARYLENESILOXANE) FLUIDS
Norman G. Holdstock, Scotia, N.Y., assignor to General Electric Company, a corporation of New York
No Drawing. Filed Dec. 14, 1961, Ser. No. 159,422
14 Claims. (Cl. 260—448.2)

This application is a continuation-in-part of my copending application Serial No. 780,259 filed December 15, 1958, now abandoned.

This invention relates to poly(arylenesiloxane) fluids which are characterized by favorable low and high temperature qualities. More particularly, it relates to poly(arylenesiloxane) fluids which are branched with siloxane-containing branches or which have an unsymmetrically substituted silarylene structure.

The use of polyorganosiloxane fluids for high temperature applications such as for hydraulic fluids, heat transfer fluids, as engine oils, or high temperature lubricants for gears, bearings, and the like, and as bases for high temperature greases, is well known. However, at elevated temperatures, many of such polyorganosiloxane fluids are subject to cyclization or rearrangement. For example, a typical dimethylpolysiloxane fluid has a sharp break in the vapor pressure-temperature curve at about 600° F., indicating rearrangement of the siloxane (Si—O—Si) bond, to form cyclic compounds which are relatively volatile, which have a high vapor pressure, and are deficient as high temperature fluids. A typical methylphenylpolysiloxane containing about 40 mol percent phenyl groups has been found to have a break in its vapor pressure-temperature curve at from about 550° F. to 600° F., again indicating rearrangement of the molecular structure. It has been noted that such rearrangements appear to occur in such polysiloxanes where each silicon atom has two siloxane type bonds. Obviously, such fluids are not useful for present-day applications where temperatures commonly rise over 700° F., as in jet engines, and similar equipment. While a silarylenesiloxane polymer chain-stopped with a monofunctional silane, such as a trimethylhalosilane-derived group, does not exhibit any such rearrangement at temperatures of over 800° F. and higher, it tends to crystallize at room temperatures, thus making it deficient, since such fluids for normal usage must not only have a suitable high temperature viscosity but a useful fluidity at even sub-zero temperatures.

The principal object of the invention is to provide fluids of the poly(silarylenesiloxane) type which can be used not only at normal and low temperatures but at temperatures up to the order of about 800° F.

Briefly, the invention provides new and useful poly(arylenesiloxanes) with desirable high temperature qualities having arylenesiloxane groups of the formula (1)
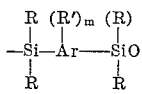

and selected from the class of (A) polymers in which the silicon atoms in the group of Formula 1 are unsymmetrically arranged with respect to each other in the arylene structure and (B) branched polymers in which the silicon atoms in the group of Formula 1 can be symmetrically or unsymmetrically arranged with respect to each other in the arylene structure and which contain monoorganosiloxane groups having the formula:

(2) $RSiO_{1.5}$ whereby siloxane-containing branches are present on one or more of the silicon atoms, such that the polymer is unsymmetrical, where R are alkyl groups, preferably lower alkyl groups such as methyl, ethyl, propyl, butyl, etc.; aryl groups such as phenyl, tolyl, etc.; substituted groups of the above types, such as halogen-substituted, e.g., chlorine, bromine, fluorine, etc., and mixtures of such groups, R' is hydrogen or the same as R, Ar is an arylene group, such as phenylene, biphenylene, terphenylene, diphenyl ether, naphthalene, anthracene, etc., as well as halogenated groups of this type and mixtures of such groups; $n$ in a number from about 1 to 50, and $m$ is a number from 1 up to the number of free positions on Ar.

One form of the unsymmetrical materials of the invention in which the silicon atoms of the group of Formula 1 are unsymmetrically substituted can be expressed by the formula:

(3)
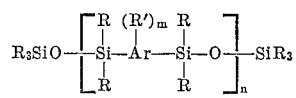

where R, R', Ar, and $m$ are as defined above, and $n$ is a number from about 1 to 50.

One form of the branched poly(arylenesiloxane) compositions of the invention can be expressed by the formula:

(4)
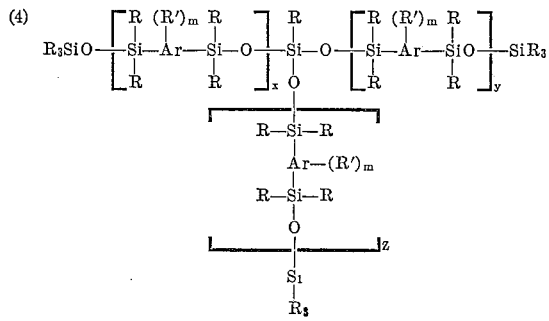

where R, R', Ar and $m$ have the same meaning as above, and $x$, $y$, and $z$ are numbers from about 1 to 50.

In Formulae 2 and 3 the siloxane-containing side branches and the unsymmetrically substituted groups are such that the polymer chain is unsymmetrical. This dissymmetry combined with the free rotation possible with the alternating siloxane bond provides blends with very low pour points, even though the molecular weights of the materials are rather high. Furthermore, it has been found that the poly(arylenesiloxane) fluids, in order to make useful materials, must be acid equilibrated. Base equilibration is not suitable in the preparation of these materials.

The materials within the scope of Formula 3 are unsymmetrical by virtue of a lack of symmetry in the arylenesiloxane groups of Formula 1, i.e., the silicon atoms in the group of Formula 1 are unsymmetrically arranged with respect to each other in the arylene structure. For example, these silicon atoms can be ortho or meta to each other in the arylenesiloxane group but cannot be in the para positions. The unsymmetrical materials of Formula 3 can be described as triorganosilyl chain-stopped materials consisting essentially of from about 1 to 50 of the recurring arylenesiloxane groups of Formula 1, where the organo groups of the triorganosilyl chain-stopping units are within the scope of the R groups previously defined.

The dissymmetry in the poly(arylenesiloxane) materials of Formula 4 can be attributed, at least in part, to the presence of a monoorganosiloxane unit in the compositions. Since the monoorganosiloxane unit is connected to three other silicon atoms through a siloxane unit, branching occurs in the composition. This branching renders the composition unsymmetrical and gives it the desirable properties heretofore mentioned. While the dissymmetry in the compositions of Formula 4 is attributed at least in part to the presence of the monoorganosiloxane unit, further dissymmetry can be introduced by the arylenesiloxane units. These arylenesiloxane units may be either symmetrical or unsymmetrical, i.e., the silicon atoms can be symmetrical with respect to each other in the arylenesiloxane unit or the silicon atoms can be unsymmetrical with respect to each other in the arylenesiloxane unit. While Formula 4 shows the presence of only a single monoorganosiloxane unit per molecule, it should be understood that a plurality of the monoorganosiloxane units can be present. Each of the monoorganosiloxane units introduces further dissymmetry into each molecule of the composition of Formula 4. The compositions of Formula 4 can be described as triorganosilyl chain-stopped materials consisting essentially of a plurality of intercondensed arylenesiloxane units and monoorganosiloxane units, with the organo groups of the triorganosilyl chain-stopping units being within the scope of R as previously defined.

In addition to the unsymmetrical poly(arylenesiloxane) materials shown above in Formula 3 and the branched compositions of Formula 4, the unsymmetrical poly-(arylenesiloxane) fluids of the present invention can also contain intercondensed diorganosiloxane units. The unsymmetrical poly(arylenesiloxane) fluids containing intercondensed diorganosiloxane units can be more particularly described as (A) fluids consisting essentially of diorganosiloxane units, $(R)_2SiO$, triorganosiloxane units, $(R)_3SiO_{0.5}$ and arylenesiloxane groups of Formula 1 having silicon atoms attached to arylene by silicon-carbon linkages and unsymmetrically positioned thereon, where each of said arylenesiloxane groups can be joined to a member selected from said arylenesiloxane groups, said diorganosiloxane units and said triorganosiloxane units; and each of said diorganosiloxane units can be joined to a member selected from said diorganosiloxane units and said triorganosiloxane units and (B) fluids consisting essentially of monoorganosiloxane units of Formula 2, diorganosiloxane units $(R)_2SiO$, triorganosiloxane units $(R)_3SiO_{0.5}$ and arylenesiloxane groups of Formula 1 having silicon atoms attached to arylene through silicon-carbon linkages where each of said arylenesiloxane groups can be joined to a member selected from said arylenesiloxane groups, said monoorganosiloxane units, said diorganosiloxane units, and said triorganosiloxane units; each of said diorganosiloxane units can be joined to a member selected from said diorganosiloxane units, said monoorganosiloxane units, and said triorganosiloxane units; and each of said monoorganosiloxane units can be joined to a member selected from said monoorganosiloxane units and said triorganosiloxane units, and where the R groups of said monoorganosiloxane units, diorganosiloxane units and triorganosiloxane units of said unsymmetrical poly(arylenesiloxane) fluid of (A) and (B) respectively, are attached to silicon through carbon-silicon linkages and in a ratio therein of more than two R groups per silicon atom, and where R, of (A) and (B) is as defined above.

The fluids described in the preceding paragraph as consisting essentially of diorganosiloxane units, triorganosiloxane units and arylenesiloxane groups can also be described as fluids consisting essentially of intercondensed diorganosiloxane units having the formula $(R)_2SiO$, triorganosiloxane units having the formula $(R)_3SiO_{0.5}$ and arylenesiloxane groups of Formula 1, where the silicon atoms of said arylenesiloxane groups are unsymmetrically positioned. These fluids can contain from about 10 to 90 mol percent diorganosiloxane units, and from 10 to 90 mol percent arylenesiloxane units with there being sufficient triorganosiloxane units to provide chain-stopping. In general, the chain-stopping triorganosiloxane units are present in an amount equal to from about 0.5 to 50 mol percent. All of the foregoing mol percents are based on the total mols of siloxane units and arylenesiloxane units in the fluids.

The fluids described previously as consisting essentially of monoorganosiloxane units, diorganosiloxane units, and triorganosiloxane units and arylenesiloxane units can also be described as fluids consisting essentially of intercondensed monoorganosiloxane units, diorganosiloxane units, triorganosiloxane units and arylenesiloxane groups of Formula 1, where the silicon atoms of the arylenesiloxane units can be positioned either symmetrically or unsymmetrically with respect to each other as previously described. These fluids can contain from about 10 to 90 mol percent diorganosiloxane units, from about 10 to 90 mol percent of arylenesiloxane groups, from about 1 to 25 percent monoorganosiloxane units with sufficient triorganosiloxane units to provide chain-stopping. In general, the triorganosiloxane units are present in an amount equal to from about 0.5 to 40 mol percent. Again the mol percents are based on the total mols of siloxane units and arylenesiloxane units in the fluids.

In general, the unsymmetrically substituted materials of the invention can be prepared by reacting an unsymmetrically substituted halo-aromatic compound such as m-dibromobenzene, m,m'-dibromodiphenyl, etc., with a dihalo-silane of the formula $R_2X_2Si$ where R has the same meaning as above and X is a halogen atom such as chlorine, bromine and iodine. This same formula applies to such materials referred to elsewhere in this description. Convenient materials of this type are dimethyldichlorosilane and the dibromo or diiodosilanes. While theoretically two mols of the dihalo-silane are required for each mol of aromatic compound via the Grignard reaction, such proportions of ingredients result in the formation of a polysilarylene rather than the desired monomer. To preclude such result, about ten times the theoretical amount of dihalosilane is used. After reaction, the product is purified as by distillation and hydrolyzed either alone, with a triorganohalosilane chainstopper material, or with a mixture of a diorganodihalosilane and a triorganohalosilane, the amount of chain-stopper determining the length of the chain. The triorganohalosilanes of the invention can be expressed by the formula $R_3XSi$ where R and X have the same meaning as above. As pointed out above, the polymeric materials of the invention must be equilibrated with acid rather than a base. Such equilibration is carried out with mineral acids in the well-known manner. Generally, from about 1 to 50 percent, by weight, based on the weight of the polymer of mineral acid such as sulphuric acid of 75% to 96% strength is used although it must be kept in mind that too high an acid content will cause cleavage of the carbon-silicon bonds. Preferably, about 3 percent, by weight, of 86% sulphuric acid is used, the equilibration taking two hours at 100° C. It will be realized that higher acid concentrations will also speed the equilibration process. For example, 10 percent of 86% sulphuric acid will lower the equilibration time to about 1 hour. The preferred 3 percent quantity of 86% sulphuric acid results in an equilibration process which is convenient both from the point of view of time as well as little or no cleavage of carbon-silicon bonds. The equilibration product is neutralized, filtered and devolatilized.

In preparing the branched poly(silarylenesiloxane) fluids of the invention, the monomeric material is again conveniently prepared as above, by reacting the haloaryl material with an excess of diorganodihalosilane. The purified product is cohydrolyzed with organotrihalosilane and triorganohalosilane, or with a mixture of organotrihalosilane, diorganodihalosilane and triorganohalosilane, such that the total functionality of the mixture is less than two or the organo to silicon ratio is more than 2. Gelling tends to take place at an organic group to silicon ratio of less than about 2. The diorganodihalosilanes and triorganohalosilanes of the invention are defined above. The organotrihalosilanes are expressed by the formula RX₃Si where R and X have the same meaning as above. The hydrolyzate is equilibrated with acid as above either directly or with extra triorganosiloxy units depending upon the desired molecular weight of the end product. The product is neutralized, filtered and devolatilized as above.

*Example 1*

This example illustrates the preparation of the unsymmetrically-substituted material. There were mixed together 1731 grams of 2,4-dibromotoluene with 6100 grams of dimethyldichlorosilane and 454 grams of diethyl ether, the mixture being added slowly to 78 grams of magnesium and 454 grams of diethyl ether in a flask fitted with a stirrer and reflux condenser at a rate sufficient to maintain a constant reflux temperature of about 55° to 60° C. When the reaction was complete, the magnesium salts were filtered from the liquid solution and the excess dimethyldichlorosilane removed by distillation. The remaining silphenylene mixture was carefully distilled in a Todd distillation column, and a fraction boiling at from about 105° to 107° C., at 1.5 mm. of mercury was obtained. This material was a liquid monomer and was shown by infrared methods to be 2,4-bis(dimethylchlorosilyl) toluene. Three hundred sixty grams of the silyl toluene material were hydrolyzed or polymerized with 50 grams of trimethylchlorosilane and neutralized, filtered, and equilibrated with 3 percent of 86% sulphuric acid for two hours at 100° C. The resulting fluid was neutralized with sodium carbonate, filtered, and devolatilized at 350° C. at 5 mm. of mercury. The resulting fluid had a pour point below −100° F. At −30° F. it had a viscosity of 8418 centistokes. At 0° F. the viscosity was 2280 centistokes, and at 100° F. the viscosity was 61.6 centistokes. The material when tested in an isoteniscope was stable at temperatures of up to about 800° F., exhibiting none of the rapid siloxane rearrangement shown at such temperatures in conventional siloxane fluids.

No reaction of any kind occurred when it was attempted to equilibrate 200 grams of 1,4-bis(hydroxy dimethylsilyl) benzene and 20 grams of hexamethyldisiloxane with 0.2 gram of KOH as the catalyst. Equilibration temperatures were raised as high as 235° C. with a general reflux of the hexamethyldisiloxane and the amount of basic catalyst was increased to 1 percent but none of the hexamethyldisiloxane was tied into the polymer.

In preparing the siloxane-branched poly(silarylenesiloxane) materials of the invention, it is preferred to use from about 1 percent to 10 percent, by weight, of a trifunctional silane and an equivalent amount of chain-stopper or monofunctional material, based on the weight of the silarylene material.

*Example 2*

This example illustrates the preparation of the siloxane-branched poly(silarylenesiloxane) material. A mixture of 1000 grams of 1,4-bis(dimethylchlorosilyl) benzene along with 84 grams of phenyltrichlorosilane and 100 grams of trimethylchlorosilane in 1 liter of toluene was hydrolyzed by addition over a period of about 20 minutes to 3 liters of water. The hydrolyzate was neutralized with sodium carbonate and dried. There was added to this hydrolyzate 2 percent, by weight, based on the hydrolyzate of hexamethyldisiloxane, and the mixture equilibrated for two hours at about 100° C., using 3 percent, by weight, based upon the material, of 86% sulphuric acid. The fluid was again neutralized, dried, and devolatilized to 350° C. at a pressure of 5 mm. of mercury vacuum or pressure. The material had a viscosity at −30° F. of 15,340 centistokes, at 0° F. a viscosity of 3480 centistokes, at 100° F. a viscosity of 180 centistokes, at 600° F. 3.2 centistokes, and at 800° F. 1.9 centistokes. No break appeared in the vapor pressure-temperature curve until a temperature of over 800° F. had been reached, indicating again that there was no rearrangement of the siloxane bonds or units at over 800° F.

*Example 3*

Example 2 was repeated except that 256 grams of 1,4-bis(dimethylchlorosilyl) benzene was used along with 140 grams of tetrachlorophenyl trichlorosilane and 65 grams of trimethylchlorosilane. As in Example 2, the blend was dissolved in toluene, hydrolyzed, the toluene removed and the oil equilibrated with sulphuric acid as above for two hours. The oil was then neutralized, filtered, and devolatilized at 300° C. at 3 mm. of mercury. There was no break in the vapor pressure-temperature curve of this material up to over 700° F. The viscosity of the final branched fluid at 100° F. was over 500 centistokes.

*Example 4*

This example illustrates the preparation of the branched material containing diorganosiloxane units. Example 2 was repeated using 526 grams of 1,4-bis(dimethylchlorosilyl) benzene along with 70 grams of tetrachlorophenyltrichlorosilane, 33 grams of trimethylclorosilane and 65 grams of dimethylidichlorosilane. The final branched fluid had no break in its vapor pressure-temperature curve at over 700° F. Its viscosity at 100° F. was over 500 centistokes.

*Example 5*

This example illustrates the preparation of the unsymmetrically substituted material containing diorganosiloxane units. A mixture of 118 parts of m-dibromobenzene and 645 parts of dimethyldichlorosilane was added to a mixture of 26 parts of magnesium metal and 100 parts of diethyl ether. The addition was regulated so that the temperature was maintained at reflux, that is, i.e. between 55° C. to 60° C. over a period of about ten hours. The mixture was distilled and there was recovered 19 parts of bis-(m-dimethylchlorosilyl)benzene based on infrared spectra. A cohydrolyzate was formed by adding a toluene solution of 19 parts of the above bis-(m-dimethylchlorosilyl)benzene, 3.1 parts of dimethyldichlorosilane and 2 parts of trimethylchlorosilane to water. The organic layer was separated and neutralized with sodium carbonate. There was added to the resulting cohydrolyzate, 3.55 parts of octamethylcyclotetrasiloxane and the resulting mixture was equilibrated for 2 hours at about 100° C. with 3 percent by weight of the mixture of cohydrolyzate and cyclic siloxane of 86% sulphuric acid. A fluid product was obtained which had a viscosity of about 11.7 centistokes at 100° F. and 106 centistokes at −30° F.

There are provided by this invention acid-equilibrated poly-silarylenesiloxane) fluid compositions which are useful as high temperature fluids, such as engine oils, gear and bearing lubricants, jet engine lubricants, hydraulic fluids, heat transfer fluids, and high temperature grease bases for operation at temperatures of 800° F., and over. They are also stable at low temperatures. As pointed out above, the materials must be acid-equilibrated in order to provide useful end products. Furthermore, they must be unsymmetrical if fluids which remain in such state at high as well as low temperatures are to be attained.

What I claim as new and desire to secure by Letters Patent of the United States is:

1. An acid-equilibrated organopolysiloxane fluid chain-stopped with triorganosiloxane units of the formula

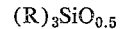

selected from the class consisting of (1) unsymmetrical poly(arylenesiloxane) fluids having arylenesiloxane units of the formula

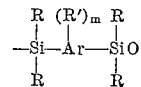

in which the silicon atoms are attached to arylene through silicon-carbon linkages and unsymmetrically positioned thereon and (2) branched poly(arylenesiloxane) fluids having arylenesiloxane units of the formula

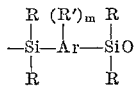

in which the silicon atoms are attached to arylene through silicon-carbon linkages and organosiloxane units of the formula $$RSiO_{1.5}$$

whereby siloxane-containing branches are present on one or more of the silicon atoms, where said acid-equilibrated organopolysiloxane fluid has a ratio of more than two R radicals per silicon atom, Ar is a member selected from the class of arylene groups, halogenated arylene groups and mixtures thereof, R is a member selected from the class consisting of lower alkyl groups, aryl groups, and halogen-substituted lower alkyl and aryl groups and mixtures thereof, R' is a member selected from the class consisting of R, hydrogen and mixtures thereof and $m$ is a number from 1 up to the number of free positions on Ar.

2. An acid-equilibrated organopolysiloxane fluid selected from the class consisting of (1) unsymmetrical poly(arylenesiloxane) fluids having siloxane-containing branches and represented by the formula

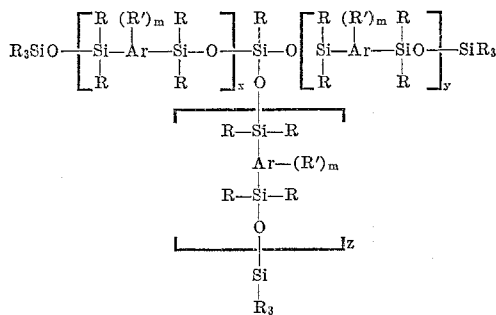

where R is a member selected from the class consisting of lower alkyl groups, aryl groups, halogen-substituted lower alkyl and aryl groups and mixtures thereof, R' is a member selected from the class consisting of R, hydrogen, and mixtures thereof, Ar is selected from the class consisting of arylene groups, halogenated arylene groups and mixtures thereof, $m$ is a number from 1 up to the number of free positions on Ar, and $x$, $y$ and $z$ are numbers from about 1 to 50 and (2) poly(arylenesiloxane) fluids having an unsymmetrically substituted silarylene structure and represented by the formula

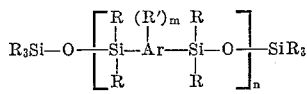

where R, R', Ar and $m$ have the same meaning as above and $n$ is a number from about 1 to 50.

3. An acid-equilibrated organopolysiloxane fluid having siloxane containing branches and represented by the formula

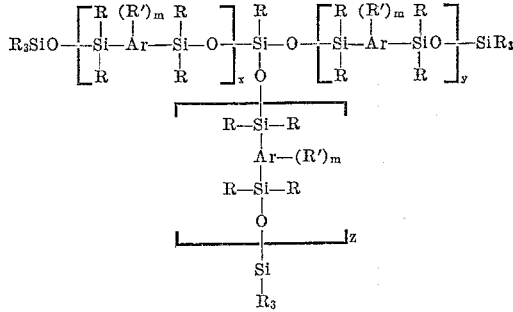

where R is a member selected from the class consisting of lower alkyl groups, aryl groups, halogen-substituted lower alkyl and aryl groups and mixtures thereof, R' is a member selected from the class consisting of hydrogen, R, and mixtures thereof, Ar is selected from the class consisting of arylene groups, halogenated arylene groups and mixtures thereof, $m$ is a number from 1 up to the number of free positions on Ar and $x$, $y$ and $z$ are numbers from about 1 to 50.

4. An acid-equilibrated organopolysiloxane fluid having an unsymmetrically substituted silarylene structure and represented by the formula

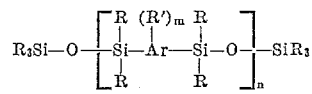

where R is a member selected from the class consisting of lower alkyl groups, aryl groups, halogen-substituted lower alkyl and aryl groups and mixtures thereof, R' is selected from the class consisting of hydrogen, R, and mixtures thereof, Ar is selected from the group consisting of arylene groups, halogenated arylene groups and mixtures thereof, $m$ is a number from 1 up to the number of free positions on Ar, and $n$ is a number from about 1 to 50.

5. The process for preparing unsymmetrical poly(arylenesiloxane) fluids comprising (1) cohydrolyzing an unsymmetrically substituted bis-(halodiorganosilyl)arylene and a triorganohalosilane and (2) acid-equilibrating the resulting hydrolyzate, where the organo groups of said bis-(halodiorganosilyl) arylene and said triorganohalosilane are members selected from the class consisting of lower alkyl groups, aryl groups, halogen substituted lower alkyl and aryl groups, and mixtures thereof.

6. The process for preparing an unsymmetrical poly(silarylenesiloxane) fluid comprising (1) cohydrolyzing a bis-(halodiorganosilyl)arylene, from 1 to 10 percent, based on the weight of said bis-(halodiorganosilyl)arylene of an organotrihalosilane and sufficient triorganohalosilane to provide for a ratio of more than 2 organo groups per silicon atom in the resulting hydrolyzate and (2) acid-equilibrating said hydrolyzate where said organo groups are attached to silicon through carbon-silicon linkages and selected from the class consisting of lower alkyl groups, aryl groups, halogen substituted lower alkyl and aryl groups, and mixtures thereof.

7. An acid-equilibrated fluid in accordance with claim 3 where R is methyl and Ar is phenylene.

8. An acid-equilibrated fluid in accordance with claim 4 where R is methyl and Ar is phenylene.

9. The process for preparing an unsymmetrical poly(silarylenesiloxane) fluid comprising (1) cohydrolyzing a bis-(halodiorganosilyl)arylene and a mixture of organohalosilanes, comprising a diorganodihalosilane, from 1 to 10 percent, based on the weight of said bis-halodiorganosilyl)arylene of an organotrihalosilane and sufficient triorganohalosilane to provide for a ratio of more than two organo groups per silicon atom in the resulting hydrolyzate and (2) acid-equilibrating said hydrolyzate, where said organo groups are attached to silicon through carbon-silicon linkages and are selected from the class consisting of lower alkyl groups, aryl groups, halogen-substituted lower alkyl and aryl groups, and mixtures thereof.

10. The process for preparing an unsymmetrical poly(silphenylene siloxane) fluid comprising (1) cohydrolyzing 1,3-bis-(dimethylchlorosilyl)benzene and trimethylchlorosilane and (2) acid-equilibrating the resulting hydrolyzate.

11. The process for preparing an unsymmetrical poly(silphenylene siloxane) fluid comprising (1) cohydrolyzing a bis-(dimethylchlorosilyl) benzene and a mixture of methylchlorosilanes consisting of dimethyldichlorosilane, from 1 to 10 percent, based on the weight of said bis-(dimethylchlorosilyl) benzene of methyltrichlorosilane and sufficient trimethylchlorosilane to provide for a ratio of more than two methyl groups per silicon atom in the resulting hydrolyzate and (2) acid-equilibrating the resulting hydrolyzate.

12. An acid-equilibrated unsymmetrical poly(silarylenesiloxane) fluid selected from the class consisting of (A) fluids consisting essentially of diorganosiloxane units, $(R)_2SiO$, triorganosiloxane units, $(R)_3(SiO_{0.5}$, and arylenesiloxane units of the formula

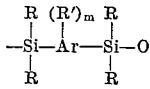

having silicon atoms attached to arylene by silicon-carbon linkages and unsymmetrically positioned thereon, where each of said arylenesiloxane units can be joined to a member selected from the class consisting of said arylenesiloxane units, said diorganosiloxane units and said triorganosiloxane units; each of said diorganosiloxane units can be joined to a member selected from the class consisting of said diorganosiloxane units and said triorganosiloxane units and (B) fluids consisting essentially of monoorganosiloxane untis, $(R)SiO_{1.5}$, diorganosiloxane units, $(R)_2SiO$, and triorganosiloxane units, $(R)_3SiO_{0.5}$, and arylenesiloxane units of the formula

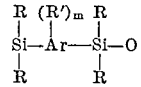

having silicon atoms attached to arylene through silicon-carbon linkages, where each of said arylenesiloxane units can be joined to a member selected from the class consisting of said arylenesiloxane units, said monoorganosiloxane units, said diorganosiloxane units, and said triorganosiloxane units; each of said diorganosiloxane units can be joined to a member selected from the class consisting of said diorganosiloxane units, said monoorganosiloxane units and said triorganosiloxane units; and each of said monoorganosiloxane units can be joined to a member selected from the class consisting of said monoorganosiloxane units and said triorganosiloxane units, and where the R groups of said monoorganosiloxane units, diorganosiloxane units and triorganosiloxane units of said unsymmetrical poly(arylenesiloxane) fluids of (A) and (B) respectively are attached to silicon through carbon-silicon linkages and in a ratio therein of more than two R groups per silicon atom, and where R is a member selected from the class consisting of lower alkyl groups, aryl groups, halogen-substituted aryl groups and aryl groups and mixtures thereof, R' is a member selected from the class consisting of hydrogen, R, and mixtures thereof, Ar is a member selected from the class consisting of arylene groups, halogenated arylene groups and mixtures thereof, and $m$ is a number from 1 up to the number of free positions on Ar.

13. An acid-equilibrated unsymmetrical poly(silphenylenesiloxane) fluid consisting essentially of dimethylsiloxane units, trimethylsiloxane units, and 1,3-bis-(dimethylsilyl)phenylenesiloxane units, and where there is more than an average ratio of two methyl groups per silicon atom in said unsymmetrical poly(silphenylenesiloxane) fluid.

14. An acid-equilibrated unsymmetrical poly-silphenylenesiloxane) fluid consisting essentially of methylsiloxane units, dimethylsiloxane units, trimethylsiloxane units, and bis-(dimethylsilyl) phenylenesiloxane units, and where there is more than an average ratio of 2 methyl groups per silicon atom in said unsymmetrical poly(silphenylenesiloxane) fluid.

References Cited in the file of this patent

UNITED STATES PATENTS

| | | |
|---|---|---|
| 2,562,000 | Sveda | July 24, 1951 |
| 2,709,692 | Gainer | May 31, 1955 |
| 3,050,542 | Piccoli | Aug. 21, 1962 |
| 3,053,872 | Omietanski | Sept. 11, 1962 |

FOREIGN PATENTS

| | | |
|---|---|---|
| 1,246,989 | France | Oct. 17, 1960 |